May 27, 1969 SHINICHIRO OGAWA 3,446,988

TRANSISTORIZED SAFETY SWITCH

Filed Dec. 21, 1965 Sheet 1 of 3

INVENTOR.
SHINICHIRO OGAWA

BY George E. Bodenstein
AGENT

May 27, 1969 SHINICHIRO OGAWA 3,446,988

TRANSISTORIZED SAFETY SWITCH

Filed Dec. 21, 1965 Sheet 2 of 3

INVENTOR.
SHINICHIRO OGAWA
BY [signature]
AGENT

May 27, 1969 SHINICHIRO OGAWA 3,446,988

TRANSISTORIZED SAFETY SWITCH

Filed Dec. 21, 1965

Sheet 3 of 3

INVENTOR.
SHINICHIRO OGAWA

BY George E. Bodenstein
AGENT

United States Patent Office 3,446,988

Patented May 27, 1969

3,446,988

TRANSISTORIZED SAFETY SWITCH

Shinichiro Ogawa, Tokyo, Japan, assignor to Honeywell Inc., Minneapolis, Minn., a corporation of Delaware Filed Dec. 21, 1965, Ser. No. 515,367
Claims priority, application Japan, Dec. 25, 1964, 39/72,889
Int. Cl. H02h 7/20
U.S. Cl. 307—202 2 Claims

ABSTRACT OF THE DISCLOSURE

Electrical continuity between the load terminals of a series measuring and/or control circuit is maintained at all times by permanently connecting the emitter-base path of a transistor between these terminals, and by detachably connecting the load and a bias voltage source in series across the collector-base path of the transistor. The base-emitter path of a second transistor may be included in series with the load, with the collector of this transistor connected to the emitter of the first transistor.

The present invention relates to a safety switch which can be used in disconnecting an electric device from a direct current path system including said electric device, or which can be used inserted between detachable electric units and the like.

In general, electronic instruments for process control use direct current signal systems to indicate the process variable so that all electric devices operating with the electronic instrument are connected in series and a signal current passes through all electric devices forming a direct current path system. In the case where one or more electric devices are replaced by one or more other electric devices in this type of direct current path system, there will be a temporary open-circuit in the direct current path system thus giving rise to an inconvenient situation.

This inconvenience is avoided by use of a safety switch. In the past, however, mechanical or magnetic safety switches have been used.

However, it is noted that these previously used mechanical or magnetic safety switches have various defects in reliability, construction, cost and the like.

Therefore it is one aim of the present invention to provide a purely electronic safety switch which eliminates the defects of the conventional safety switch and which is highly reliable, has simple construction, and is advantageous also in point of cost.

It is another aim of the present invention to provide a purely electronic safety switch which can be used as a change-over switch to insert other electric devices, a current meter, for example, in series into the direct current path system.

Figure 1:
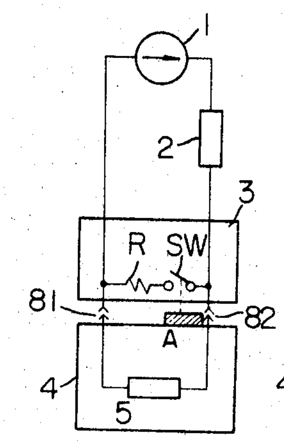
Figures 2, 3:
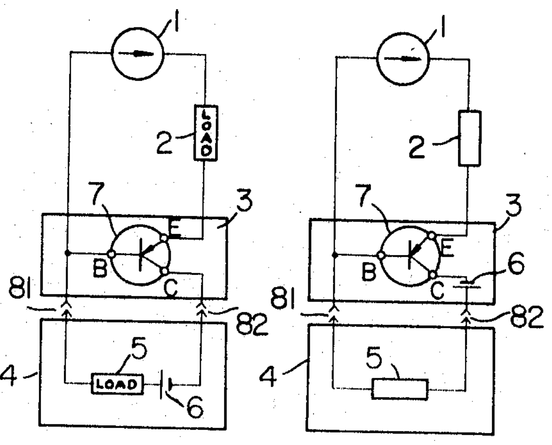
Figure 4:
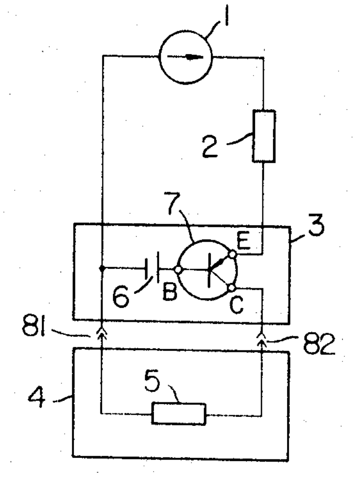
Figure 5:
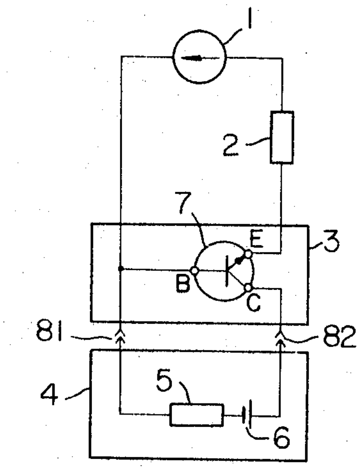
Figure 6A:
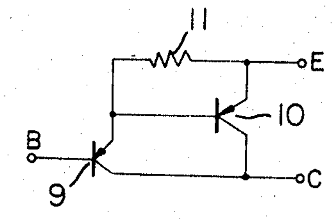
Figure 6B:
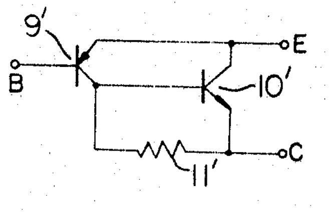
Figure 9:
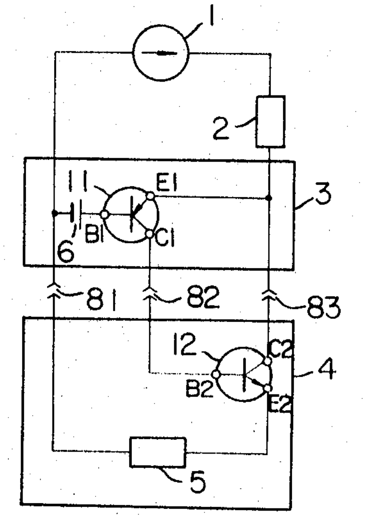
Figure 10:
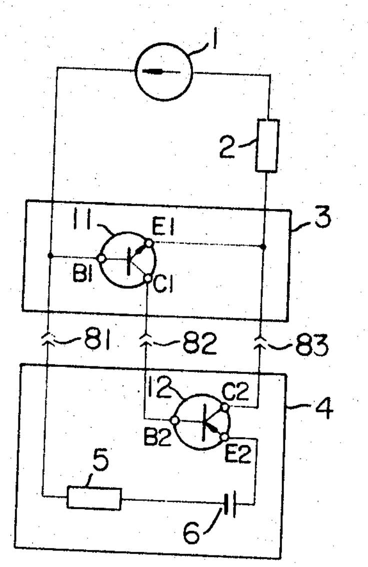
Figure 11:
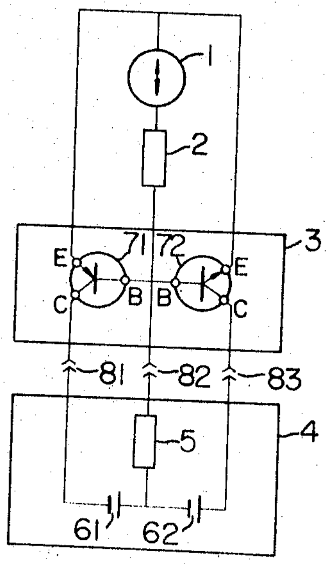

The nature of the present invention will be better understood from the following description of embodiments thereof taken in conjunction with the accompanying drawings in which:

FIG. 1 is a circuit diagram of a mechanical safety switch of prior art,

FIG. 2, FIG. 3 and FIG. 4 are circuit diagrams of a transistor switch in accordance with the present inventioin, each of which comprises a PNP type transistor, FIG. 5 is a circuit diagram of a transistor switch in accordance with the present invention which comprises NPN type transistor, FIG. 6(*a*) shows a compound transistor circuit constructed in Darlington connection, FIG. 6(*b*) shows a compound transistor circuit constructed in complementary connection, FIG. 7, FIG. 8, FIG. 9, and FIG. 10 show other embodiments of the transistor switch employing the three-wire system of connection, FIG. 11 shows the present transistor switch applied to a two-diretcion direct current signal source.

Referring to FIG. 1, 1 is a signal current source, 2 is a load, 3 is a safety switch, R is a protective resistor and SW is a switch. 4 is an electric device, for example a recording meter. A is a driving-lever or a driving magnet mounted on electric device 4 to drive switch SW. Safety switch 3 is usually mounted on a fixed part of the apparatus, for example, the case of the apparatus and switch SW, as shown in FIG. 1, is opened by the driving lever or driving magnet A when detachable electric device 4 is inserted into the direct current path system. Conversely, when electric device 4 is disconnected from the direct current path system SW will close so that a closed loop is continuously maintained in the direct current system. With the conventional mechanical switch illustrated in FIG. 1, there is the inconvenience of making preliminary adjustment of the safety switch so that it will operate prior to the disconnection of safety switch 3 from electric device 4. Moreover, it is often necessary to raise the degree of precision in manufacturing the parts of the safety switch so as to increase its reliability.

It is the aim of the present invention to resolve the mentioned defects of the conventional safety switch and the construction and operation of the present invention is described in the following: FIG. 2 shows a transistor switch in accordance with the present invention which employs a PNP type transistor 7, base B and emitter E of which are connected across a series circuit comprised of direct current signal source 1 and external load 2; and furthermore base B and collector C of PNP type transistor 7 being detachably connected through connectors 81 and 82 to opposing terminals of the load circuit in electrical device 4.

The load circuit in electrical device 4 is comprised of a load 5 and transistor switch bias source 6, but bias source 6 may be provided on the side of transistor switch 3 as shown in FIG. 3, or on the base plate of transistor 7 in transistor switch 3. Referring to FIG. 2, when electric device 4 is disconnected from the signal source circuit, the base and collector circuits are opened so that transistor 7 operates as a forward diode, thus keeping the signal source in a closed circuit. When electric device 4 is connected to safety switch 3, a suitable bias voltage will be built up across the base and collector of transistor 7 so that transistor 7 may operate normally, thus causing transistor 7 collector current $\alpha I_s$ to flow through the load circuit of electric device 4. Since $\alpha$ here indicates the current amplification factor of transistor 7, the current $\alpha I_s$ through load 5 of electric device 4 is smaller in amount by $(1-\alpha)I_s$ than the signal current $I_s$. However, this amount $(1-\alpha)I_s$ corresponds to only a small percentage of the signal current $I_s$. The operation of the circuits shown in FIG. 3 and FIG. 4 are exactly the same as that of the circuit shown in FIG. 2. Referring to FIG. 5, it will be seen that the embodiment comprises NPN type transistor 7 in transistor switch 3 and that the polarity of signal source 1 and of bias voltage source 6 is the reverse of that in the embodiment shown in FIG. 2. However the operation of the circuit shown in FIG. 5 is the same as that of the circuit shown in FIG. 2. The transistor switches shown in FIG. 3 and FIG. 4 which comprise PNP transistors can be converted to transistor switches of similar construction employing NPN transistors. In this case, the polarity of the signal source and bias voltage source is reversed as in the circuit shown in FIG. 5.

In the electrical circuit where the electric device 4 is detachably connected to the direct current signal source circuit which employs a transistor switch such as those shown in FIG. 2 to FIG. 5, practical use becomes impossible in some cases because the current through load 5 in electric device 4 is smaller by several percent in comparison with signal current $I_s$. In this case, it is possible to resolve the above-mentioned defect by utilizing transistor switch 3 in a compound transistor circuit such as the Darlington-connection circuit shown in FIG. 6(*a*) or the complementary-connection circuit shown in FIG. 6(*b*). In FIG. 6(*a*), assuming the current amplification factors of transistors 9 and 10 to be respectively $\alpha_1$ and $\alpha_2$, it will be seen that the resultant current amplification factor of the compound transistor circuit without resistor 11 can be expressed as $\{1-(1-\alpha_1)(1-\alpha_2)\}$ and that the error current falls to the very small value of $(1-\alpha_1)(1-\alpha_2)I_s$. Resistor 11 is a regulating resistor of the type which is commonly utilized to adjust the small signal current operation-point of transistor 9 to a suitable value. When the compound transistor circuit of FIG. 6(*b*) is used, it is noted that the error current falls to $$\frac{(1-\dot{\alpha}_1)(1-\dot{\alpha}_2)}{1-\dot{\alpha}_2(1-\dot{\alpha}_1)}I_s$$

which is also very small in value. Here $\dot{\alpha}_1$, and $\dot{\alpha}_2$ are the current amplification factors of transistors 9′ and 10′, respectively. Resistor 11′ serves the same purpose as resistor 11. Furthermore, when a compound transistor circuit is utilized in the circuit shown in FIG. 5 instead of signal transistor 7, the PNP transistors used in FIG. 6(*a*) and FIG. 6(*b*) may, of course, be replaced by NPN type transistors and vice versa.

Figure 7:
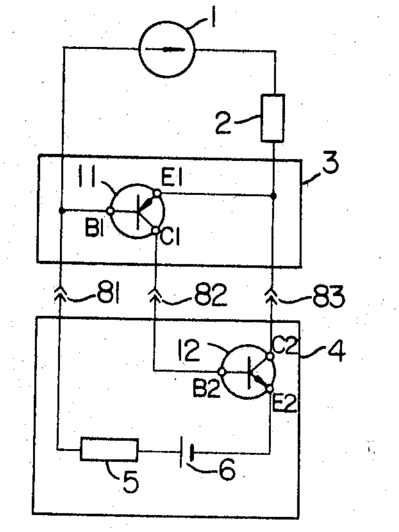
Figure 8:
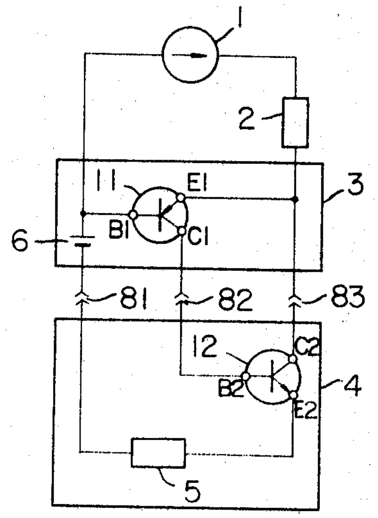

The circuits shown in FIG. 7 to FIG. 10 are other embodiments of the present invention in which the present transistor switch has been applied to the three wire system. Referring to FIG. 7, base $B_1$ and emitter $E_1$ of PNP transistor 11 in transistor switch 3 are connected across a series circuit comprising direct current signal source 1 and external load 2; base $B_1$ of PNP transistor 11 also being connected to emitter $E_2$ of transistor 12 in electric device 4 through connector 81 and load 5 and bias voltage source 6 in the electric device 4; collector plate $C_1$ of PNP transistor 11 being connected to base $B_2$ of transistor 12 in electric device 4 through connector 82; and emitter $E_1$ of the said PNP transistor 11 also being connected to a collector $C_2$ of transistor 12 in electric device 4 through connector 83. Bias voltage source 6 in the electric device 4 may be provided in transistor switch 3 as shown in FIG. 8 and FIG. 9.

The operation of the circuit of FIG. 7 is as follows: When electric device 4 is disconnected from the signal source circuit, transistor 11 in transistor switch 3 operates as a forward diode thus keeping the signal source circuit in a closed circuit. On the other hand, when electric device 4 is connected to the signal source circuit, transistor 11 in transistor switch 3 will operate normally together with transistor 12 in electric device 4 thus causing load current $$\frac{\alpha_1}{1-\alpha_1+\alpha_1\alpha_2}I_s$$

to flow through load 5 in electric device 4. In this case, it is noted that the error current falls to $$\frac{(1-\alpha_1)(1-\alpha_2)}{1-\alpha_2+\alpha_1\alpha_2}I_s$$

which is very small in value. Here $\alpha_1$ and $\alpha_2$ are the current amplification factors of transistors 11 and 12, respectively. The operational descriptions of the circuits shown in FIG. 8 and FIG. 9 are omitted in this specification as the operations of these are same as that of the circuit shown in FIG. 7.

Since the circuit of FIG. 10 is constructed by replacing PNP transistor 11 and NPN transistor 12 of FIG. 7 with a NPN transistor and PNP transistor respectively, the polarity of signal source 1 and bias voltage source 6 are accordingly reversed. The circuit operation of FIG. 10 is same to that of FIG. 7. Bias voltage source 6 in FIG. 10 can be provided in transistor switch 3 as shown in FIG. 8 and FIG. 9. Furthermore, it should be noted that the circuits shown in FIG. 7 to FIG. 10 are substantially the same as the circuits constructed by replacing transistor 7 in the circuits shown in FIG. 1 to FIG. 5 with a compound transistor circuit of the complementary connected transistor circuit type.

The transistor switch of the present invention can be applied to a circuit in which the direct current signal varies in two directions, positively and negatively. The circuit shown in FIG. 11 is an embodiment of the above-described application of the present invention, the construction of the embodiment being the combination of the circuits shown in FIG. 2 and FIG. 5. Through employment of the three-wire system circuit as in FIG. 11, various circuit combinations can be obtained. If a five-wire circuit is desired, it can be obtained by, for example, the combination of the circuits shown in FIG. 7 and FIG. 10.

As illustrated above, the transitsor switch in accordance with the present invention is industrially advantageous as it is simple in construction and is an improvement in effectiveness over conventional mechanical switches.

I claim:

1. A safety switch to maintain an electrically conductive path between a pair of electrical terminals notwithstanding the disconnection from between said terminals of an electrical device otherwise connected therebetween, comprising:

a first unit having first and second terminals, having a transistor including collector, emitter, and base electrodes, having connections connecting said emitter and base electrodes to said first and second terminals, respectively, having a first contact connected to said base electrode, and having a second contact connected to said collector electrode, a second unit having a third contact and a fourth contact, and having an electrical device connected between said third and fourth contacts, mounting means causing each of said first and second contacts to be in mutual electrical engagement with a respective one of said third and fourth contacts, to establish a series circuit between said collector and base electrodes including said device, when said first and second units have a given mutual spatial relationship, and causing at least one of said first and second contacts to be electrically disengaged from the corresponding one of said third and fourth contacts, and said series circuit to be interrupted, when said first and second units do not have said given spatial relationship, and transistor bias means included in said series circuit to cause said device to be effectively connected between said terminals when said units have said given spatial relationship.

2. A switch as specified in claim 1, wherein said second unit includes a second transistor having a base-emitter path included in said connection of said device between said third and fourth contacts, and having a collector electrode connected to said first terminal.

(References on following page)

References Cited

UNITED STATES PATENTS

| | | | |
|---|---|---|---|
| 2,663,806 | 12/1953 | Darlington | 307—88 |
| 2,921,264 | 1/1960 | Sundt | 324—110 |
| 2,972,685 | 2/1961 | Baude | 307—88.5 |
| 3,074,006 | 1/1963 | Klees | 323—9 |
| 3,122,646 | 2/1964 | Deysher et al. | 307—88.5 |
| 3,153,729 | 10/1964 | Leakey | 307—88.5 |
| 3,303,346 | 2/1967 | Atkins et al. | 250—214 |

FOREIGN PATENTS

| | | |
|---|---|---|
| 1,027,412 | 4/1958 | Germany. |

ARTHUR GAUSS, *Primary Examiner.*

S. D. MILLER, *Assistant Examiner.*

U.S. Cl. X.R.

307—253, 254, 255, 297; 317—33; 324—123